(12) United States Patent
List et al.

(10) Patent No.: US 12,522,232 B2
(45) Date of Patent: Jan. 13, 2026

(54) CONTROL DEVICE FOR A VEHICLE AND RESET METHOD FOR SUCH A CONTROL DEVICE

(71) Applicant: Robert Bosch GmbH, Stuttgart (DE)

(72) Inventors: Carsten List, Walheim (DE); Ruediger Karner, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 493 days.

(21) Appl. No.: 17/837,250

(22) Filed: Jun. 10, 2022

(65) Prior Publication Data
US 2022/0402516 A1 Dec. 22, 2022

(30) Foreign Application Priority Data
Jun. 16, 2021 (DE) .................. 10 2021 206 144.3

(51) Int. Cl.
*B60W 50/08* (2020.01)
*B60L 58/13* (2019.01)
*B60W 50/00* (2006.01)

(52) U.S. Cl.
CPC ........... *B60W 50/085* (2013.01); *B60L 58/13* (2019.02); *B60W 2050/0045* (2013.01)

(58) Field of Classification Search
CPC ......... B60W 50/085; B60W 2050/0045; B60L 58/13; H02J 2310/46; H02J 1/082; G05B 19/0428; G05B 2219/24024; B60R 16/03
See application file for complete search history.

(56) References Cited

U.S. PATENT DOCUMENTS

| | | | |
|---|---|---|---|
| 7,719,812 B2* | 5/2010 | Phadke | H02M 1/32 361/93.1 |
| 10,903,838 B1* | 1/2021 | Brunn | G06F 1/08 |
| 2003/0053275 A1* | 3/2003 | Rehtanz | H02J 3/1842 361/115 |
| 2004/0146755 A1* | 7/2004 | Meredith | H01M 8/0494 429/444 |

(Continued)

FOREIGN PATENT DOCUMENTS

CN 1950598 A 4/2007

*Primary Examiner* — Redhwan K Mawari
(74) *Attorney, Agent, or Firm* — NORTON ROSE FULBRIGHT US LLP

(57) ABSTRACT

A control device for a vehicle and a reset method for such a control device. The control device includes a voltage supply and system components including a processing unit which, with the other system components, carries out at least one device function, and selectively switches off or resets assigned individual system components depending on the function and/or depending on the state via at least one selectively generated controller reset signal, the system components being supplied by at least two different internal system voltages. At least one monitoring function monitors the at least two internal system voltages. Different voltage-related reset signals are assigned to the monitored internal system voltages. As soon as the assigned monitored internal system voltage is recognized to be erroneous, the monitoring function selectively generates and outputs a voltage-related reset signal to at least one system component which is supplied with the internal system voltage recognized as erroneous.

16 Claims, 2 Drawing Sheets

(56) References Cited

U.S. PATENT DOCUMENTS

| | | | | |
|---|---|---|---|---|
| 2007/0146192 A1* | 6/2007 | Sakata | ............... | H03M 1/1023 |
| | | | | 341/155 |
| 2008/0179955 A1* | 7/2008 | Nakashima | ............... | H02J 7/34 |
| | | | | 320/101 |
| 2012/0256611 A1* | 10/2012 | Fukui | ...................... | B60L 3/003 |
| | | | | 323/304 |
| 2014/0375327 A1* | 12/2014 | Sievers | ............. | G01R 19/0084 |
| | | | | 324/503 |
| 2016/0124480 A1* | 5/2016 | Raithel | ............... | G06F 13/4265 |
| | | | | 713/310 |
| 2016/0248242 A1* | 8/2016 | Petruzzi | ............... | H03K 17/082 |
| 2016/0329711 A1* | 11/2016 | Majumder | ............... | H02J 3/16 |
| 2018/0207791 A1* | 7/2018 | Szatmary | ............. | G05D 1/0238 |

\* cited by examiner

CONTROL DEVICE FOR A VEHICLE AND RESET METHOD FOR SUCH A CONTROL DEVICE

CROSS REFERENCE

The present application claims the benefit under 35 U.S.C. § 119 of German Patent Application No. DE 10 2021 206 144.3 filed on Jun. 16, 2021, which is expressly incorporated herein by reference in its entirety.

FIELD

The present invention relates to a control device for a vehicle. The present invention also relates to a reset method for such a control device.

BACKGROUND INFORMATION

Convention control devices from the related art, for example, airbag control devices of the applicant, use two different types of internal reset signals within the particular control device to switch off or reset system components of the control device, for example, a processing unit designed as a microcontroller, an ASIC module (ASIC: Application-Specific Integrated Circuit), at least one sensor, at least one communication interface, etc. For this purpose, the processing unit as the main component of the control device carries out at least one device function in combination with the other system components and generates a function-dependent or state-dependent first reset signal, which is also referred to as a controller reset signal, in order to switch off or reset other system components by its output, for example, to trigger a warm start of the airbag system by way of a software control, for example. For this purpose, a reset output of the processing unit is connected to most system components, so that the processing unit may control the switching off and the reset of the entire system, as well as the behavior in various system states and error modes. A second reset signal, which is also referred to as a voltage-related reset signal, is generated by a monitoring function and output at the processing unit. The status of the voltage-related reset signal is based on monitoring relevant internal system voltages. If one of the internal system voltages is recognized as erroneous, the processing unit is deactivated by the voltage-related reset signal and as a result all system components are deactivated by the controller reset signal output by the processing unit. The voltage-related reset signal is always triggered similarly, regardless which of the monitored voltages displays an error. The system reaction, like the deactivation of the processing unit and the following deactivation of the other system components, is thus always identical. The function-dependent or state-dependent controller reset signal output by the processing unit also always results in the switching off and the reset of the entire system.

SUMMARY

A control device for a vehicle in accordance with the present invention and a reset method for a control device in accordance with an example embodiment of the present invention each have the advantage that selective "switching off" or "reset" of individual system components is possible depending on error state and/or system state and/or function state by way of separate "selective" controller reset signals or by way of separate "selective" voltage-related reset signals.

One requirement for safety-relevant control devices, for example, an airbag control device, is to be autonomously available for a defined time even after the demolition of a main voltage supply in case of crash. For this purpose, such safety-relevant systems are equipped with large energy reserve capacitors, which are typically designed as aluminum electrolyte capacitors and store an energy reserve for the described autonomy case. The complete supply of all relevant system components then takes place from these energy reserve capacitors. Furthermore, the energy for triggering squibs may also be provided in an airbag system, via which airbags, pyrotechnic belt tensioners, etc. may be fired. Rising demands with respect to the storage of crash/event data in case of autonomy have the result that the energy reserves are to store more energy for a longer availability. The consequence is rising costs for the required energy reserve capacitors. The present invention is to contribute to optimizing the energy consumption in case of autonomy in that system components may be switched off or reset selectively.

Specific example embodiments of the present invention provide a control device for a vehicle, which includes a voltage supply and multiple system components. One of the system components is designed as a processing unit, which executes at least one device function in combination with the other system components and, via at least one selectively generated controller reset signal, selectively switches off or resets assigned individual system components in dependence on function and/or state. The system components are supplied by at least two different internal system voltages, at least one monitoring function monitoring the at least two internal system voltages. Various voltage-related reset signals are each assigned to at least one of the monitored internal system voltages, the at least one monitoring function, as soon as the at least one assigned monitored internal system voltage is recognized as erroneous, selectively generating a corresponding one of the reset signals and selectively outputting it to at least one system component, which is supplied with the internal system voltage recognized as erroneous. The at least one voltage-related reset signal switches off the corresponding at least one system component or resets it.

Moreover, a reset method for such a control device is provided, which includes multiple system components, of which one component is designed as a processing unit. At least two internal system voltages are monitored for this purpose and various voltage-related reset signals are each assigned to at least one of the monitored internal system voltages. As soon as the at least one assigned monitored internal system voltage is recognized as erroneous, the corresponding voltage-related reset signal is selectively generated and selectively output to at least one component, which is supplied with the internal system voltage recognized as erroneous. The at least one voltage-related reset signal resets the corresponding at least one component or switches it off.

The availability or the partial availability of the system may be increased by specific embodiments of the present invention, in that in the event of recognized voltage errors, the entire system is no longer deactivated, but only individual functions or individual components. A monitored internal system voltage may be recognized as erroneous, for example, if the corresponding present voltage level is below a predefined first threshold value or above a predefined second threshold value or outside a tolerance band, which is defined by an upper and a lower threshold value. Both an undervoltage and an overvoltage may thus result in the generation and output of a corresponding voltage-related reset signal. Furthermore, the monitoring results of multiple internal system voltages may be combined to generate and output a corresponding voltage-related reset signal. Moreover, individual system components or system functions may be selectively deactivated via the various controller reset signals, while other system components or system functions still remain available. The processing unit, as the most important system component, may remain available longer in the event of specific recognized voltage errors and/or system states than in present systems. This may also contribute to cost reductions, since, for example, the energy reserve circuits used in airbag systems for autonomous supply may be dimensioned to be smaller. These energy reserve circuits may be designed to be simpler and more cost-effective by specific embodiments of the present invention, since a selective switching off of system components may also reduce the energy demands. Specifically, in the case of autonomy, the function of the processing unit may thus be maintained longer. Thus, for example, costly aluminum electrolyte capacitors, which provide the energy reserve for the case of autonomy, may thus be dimensioned to be smaller and costs may therefore be saved. Alternatively, the maximum possible duration of the autonomy case may be extended.

The control device may be understood in the present case as an electrical device, for example, an airbag control device, which includes, for example, a voltage supply, a processing unit designed as a microcontroller, an evaluation and control circuit for voltage monitoring, at least one sensor, at least one communication interface, etc. The processing unit may process or evaluate detected sensor signals. The at least one communication interface may be designed, for example, as hardware and/or software. In a hardware design, the interfaces may be, for example, part of a so-called system ASIC (ASIC: Application-Specific Integrated Circuit), which contains greatly varying functions of the control device. However, it is also possible that the interfaces are separate integrated circuits or are at least partially made up of discrete components. In a software design, the interfaces may be software modules which are present, for example, on a microcontroller designed as a processing unit alongside other software modules. A computer program product including program code which is stored on a machine-readable carrier such as a semiconductor memory, a hard drive memory, or an optical memory and is used to carry out the evaluation when the program is executed by the processing unit is also advantageous.

The evaluation and control unit may be understood in the present case as an electrical circuit which monitors internal system voltages. For this purpose, the evaluation and control unit may process or evaluate detected voltage signals. The evaluation and control unit may include at least one interface which may be designed as hardware and/or software. In a hardware design, the interfaces may be, for example, part of an ASIC module, which contains greatly varying functions of the evaluation and control unit. However, it is also possible that the interfaces are separate integrated circuits or are at least partially made up of discrete components.

Advantageous improvements of the control device for a vehicle in accordance with the present invention and the reset method for a control device in accordance with the present invention are possible by way of the measures and refinements disclosed herein.

In accordance with an example embodiment of the present invention, it is particularly advantageous that at least one of the system components may be designed as an evaluation and control unit which is designed to carry out at least one monitoring function and to monitor the at least two different internal system voltages and to generate and output the various voltage-related reset signals. In addition, the evaluation and control unit may be designed to generate and output at least one of the various internal system voltages from a supply voltage provided by the voltage supply. The evaluation and control unit may preferably generate all internal system voltages which are required for operating the control device. For this purpose, the evaluation and control unit may include at least one voltage regulator and/or at least one voltage converter, which may each generate at least one of the various internal system voltages from the supply voltage provided by the voltage supply. Alternatively, at least one of the system components may be designed as a voltage regulator and/or voltage converter, which may generate and output at least one of the various internal system voltages from a supply voltage provided by the voltage supply.

In one advantageous example embodiment of the control device of the present invention, the at least one evaluation and control unit may be designed, for example, as a configurable ASIC module. The at least one monitoring function may thus be adapted easily to various internal system voltages to be monitored and their tolerance bands, the compliance of which is to be monitored. The configuration of the evaluation and control unit designed as an ASIC module may be carried out, for example, via pin coding, programming in the factory, programming in the control device, for example, via an SPI protocol by the processing unit, or by reading in an external memory, for example, an EEPROM. It may thus be established via a present configuration of the evaluation and control unit, for example, which of the at least two internal system voltages are to be monitored in the present design of the control device or an application to be executed, and which of the monitored internal system voltages is assigned to which voltage-related reset signal. It may thus be established, for example, depending on the design of the control device or the application to be executed that only an overvoltage recognition of the monitored internal system voltage is relevant for generating and outputting the corresponding voltage-related reset signal, an undervoltage recognition of the monitored internal system voltage then does not result in generating and outputting the corresponding voltage-related reset signal. Alternatively, only an undervoltage recognition of the monitored internal system voltage may be relevant for generating and outputting the corresponding voltage-related reset signal, an overvoltage recognition of the monitored internal system voltage then does not result in generating and outputting the corresponding voltage-related reset signal. Furthermore, both the overvoltage recognition and also the undervoltage recognition of the monitored internal system voltage may be relevant for generating and outputting the corresponding voltage-related reset signal. Moreover, it may be possible that monitoring results of multiple monitored internal system voltages are logically linked to one another in order to generate and output a corresponding voltage-related reset signal. It is thus settable which monitored internal system voltage is assigned to which of the voltage-related reset signals and which tolerances the monitored internal system voltages should maintain.

In another advantageous example embodiment of the control device of the present invention, at least one of the system components may be designed as a central sensor or as a communication interface. The central sensor may include, for example, an acceleration sensor and/or a rotation rate sensor. The control device may communicate via the communication interface with peripheral sensors and/or other control devices.

In another advantageous example embodiment of the control device of the present invention, the voltage supply may include an external voltage supply and an internal energy reserve. The external voltage supply may correspond here, for example, to a vehicle electrical system, which provides a vehicle electrical system voltage to the control device during normal operation. The internal energy reserve includes, for example, an energy store, which is charged during the normal operation and provides an energy reserve voltage to the control device during emergency operation, for example, in the event of failure of the vehicle electrical system.

In another advantageous example embodiment of the control device of the present invention, separate lines may directly transfer the voltage-related reset signals or the controller reset signals selectively to the individual system components. Alternatively, the processing unit may transfer the controller reset signals as a digital message via a shared bus to the other system components. Various reset codes may be assigned to the system components for this purpose, which are then transferred as the corresponding selective digital message via the shared bus.

In one advantageous example embodiment of the reset method of the present invention, depending on the function and/or depending on the state, at least one controller reset signal may be generated by the processing unit and output to at least one assigned system component. In this case, the at least one controller reset signal may selectively switch off and/or reset the at least one assigned system component.

In a further advantageous example embodiment of the reset method of the present invention, a first voltage-related reset signal may be generated and output to at least one of the system components as soon as a voltage level of a first internal system voltage is below a predefined first threshold value or above a predefined second threshold value or outside a first tolerance band, which is defined by the first threshold value and the second threshold value. Thus, for example, the first internal system voltage may have the highest voltage level of the internal system voltages and may supply, for example, peripheral and/or internal sensors. A second voltage-related reset signal may be generated and output to at least one of the system components, for example, as soon as a voltage level of a second internal system voltage, which is lower than the voltage level of the first internal system voltage, is below a predefined third threshold value or above a predefined fourth threshold value or outside a second tolerance band, which is defined by the third threshold value and the fourth threshold value. The second internal system voltage may, for example, supply internal sensors and/or the communication interface. A third voltage-related reset signal may be generated and output to the system component designed as the processing unit, for example, as soon as a voltage level of a third internal system voltage, which is lower than the voltage level of the second internal system voltage, is below a predefined fifth threshold value or above a predefined sixth threshold value or outside a third tolerance band, which is defined by the fifth threshold value and the sixth threshold value. Alternatively, the third voltage-related reset signal may be generated and output to the system component designed as the processing unit when a voltage level of a fourth system voltage, which is lower than the voltage level of the third internal system voltage, is below a predefined seventh threshold value or above a predefined eighth threshold value or outside a fourth tolerance band, which is defined by the seventh threshold value and the eighth threshold value. The processing unit may thus be reset if the third internal system voltage, which supplies, for example, an internal communication interface of the processing unit, or the fourth internal system voltage, which supplies, for example, a processor core of the processing unit, is erroneous. The switching off or the resetting of the processing unit is thus not carried out until the third internal system voltage or the fourth internal system voltage is erroneous.

Exemplary embodiments of the present invention are shown in the figures and are explained in greater detail in the following description. In the figures, identical reference numerals identify components or elements which carry out identical or similar functions.

DETAILED DESCRIPTION OF EXAMPLE EMBODIMENTS

Figure 1:
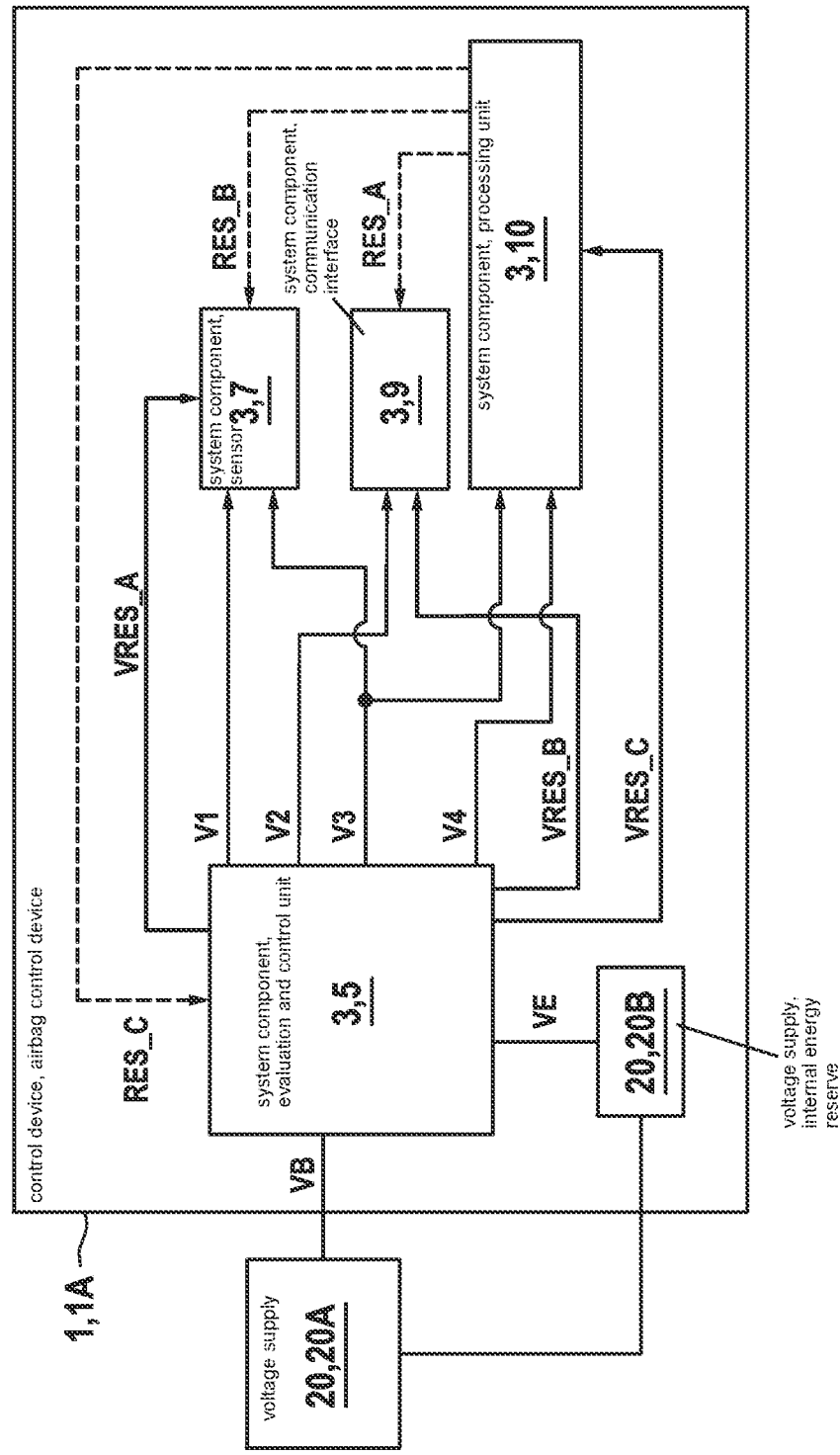
FIG. 1 shows a schematic block diagram of an exemplary embodiment of a control device for a vehicle according to the present invention.

As is shown in FIG. 1, an exemplary embodiment of a control device 1 for a vehicle according to the present invention includes a voltage supply 20 and multiple system components 3. One of system components 3 is designed as a processing unit 10 which, in combination with other system components 3, carries out at least one device function and, depending on the function and/or depending on the state, selectively switches off or resets assigned individual system components 3 via at least one selectively generated controller reset signal RES_A, RES_B, RES_C. System components 3 are supplied by at least two different internal system voltages V1, V2, V3, V4. In this case, at least one monitoring function monitors the at least two internal system voltages V1, V2, V3, V4, various voltage-related reset signals VRES_A, VRES_B, VRES_C each being assigned to at least one of monitored internal system voltages V1, V2, V3, V4. As soon as the at least one assigned monitored internal system voltage V1, V2, V3, V4 is recognized to be erroneous, the at least one monitoring function selectively generates a corresponding voltage-related reset signal VRES_A, VRES_B, VRES_C and outputs it selectively to at least one system component 3, which is supplied with internal system voltage V1, V2, V3, V4 recognized as erroneous. The at least one voltage-related reset signal VRES_A, VRES_B, VRES_C switches off the corresponding at least one system component 3 or resets it.

In the illustrated exemplary embodiment, control device 1 corresponds to an airbag control device 1A, one of system components 3 being designed as an evaluation and control unit 5. Evaluation and control unit 5 carries out the at least one monitoring function and monitors various internal system voltages V1, V2, V3, V4. Moreover, evaluation and control unit 5 generates various voltage-related reset signals VRES_A, VRES_B, VRES_C, when an erroneous internal system voltage V1, V2, V3, V4 is recognized.

As is furthermore shown in FIG. 1, evaluation and control unit 5, which is designed here as a configurable ASIC module, generates various internal system voltages V1, V2, V3, V4 from a supply voltage provided by voltage supply 20. In the illustrated exemplary embodiment, voltage supply 20 includes an external voltage supply 20A, which represents an electrical system of the vehicle and provides a vehicle electrical system voltage VB to control device 1 during normal operation, and an internal energy reserve 20B, which provides an energy reserve voltage VE to control unit 1 during emergency operation. Evaluation and control unit 5 thus generates internal system voltages V1, V2, V3, V4 from provided vehicle electrical system voltage VB during normal operation and from provided energy reserve voltage VE during emergency operation.

In an alternative exemplary embodiment (not shown) of control device 1, multiple system components 3 are designed as voltage regulators and/or as voltage converters, which generate and output various internal system voltages V1, V2, V3, V4 from the supply voltage provided by voltage supply 20. In this exemplary embodiment, evaluation and control unit 5 takes over monitoring various internal system voltages V1, V2, V3, V4 without itself generating one of internal system voltages V1, V2, V3, V4. In a further exemplary embodiment (not shown), internal system voltages V1, V2, V3, V4 may be generated both by system components 3 designed as voltage regulators and/or as voltage converters and also by evaluation and control unit 5.

Figure 2:
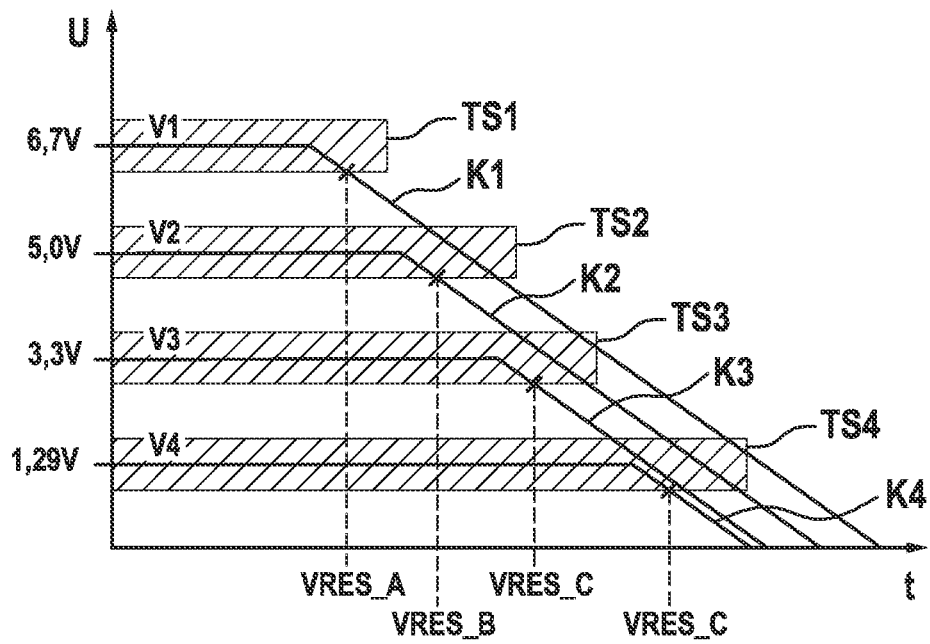
FIG. 2 shows a schematic characteristic diagram of multiple internal system voltages of the control unit according to the present invention from FIG. 1.

As is furthermore shown in FIGS. 1 and 2, in the illustrated exemplary embodiment, control device 1 includes four internal system voltages V1, V2, V3, V4. In this case, evaluation and control unit 5 generates, via multiple internal voltage converters and/or internal voltage regulators, a first internal system voltage V1 at a voltage level of 6.7 V, which in the illustrated exemplary embodiment supplies a system component 3 designed as a sensor 7, a second internal system voltage V2 at a voltage level of 5.0 V, which in the illustrated exemplary embodiment supplies a system component 3 designed as a communication interface 9, a third internal system voltage V3 at a voltage level of 3.3 V, which in the illustrated exemplary embodiment supplies an internal communication interface of system component 3 designed as sensor 7 and an internal communication interface of system component 3 designed as processing unit 10, and a fourth internal system voltage V4 at a voltage level of 1.29 V, which in the illustrated exemplary embodiment supplies a system component 3 designed as a processor core of processing unit 10.

In the illustrated exemplary embodiment of control device 1, a first voltage-related reset signal VRES_A is assigned to first internal system voltage V1. Evaluation and control unit 5 generates first voltage-related reset signal VRES_A and outputs it to system component 3 designed as sensor 7 as soon as a voltage level of first characteristic curve K1 shown in FIG. 2 falls below a predefined lower threshold value of a first tolerance band TS1. A second voltage-related reset signal VRES_B is assigned to second internal system voltage V2. Evaluation and control unit 5 generates second voltage-related reset signal VRES_B and outputs it to system component 3 designed as communication interface 9 as soon as a voltage level of second characteristic curve K2 shown in FIG. 2 falls below a predefined lower threshold value of a second tolerance band TS2. A third voltage-related reset signal VRES_C is assigned to third internal system voltage V3 and fourth internal system voltage V4. Evaluation and control unit 5 generates third voltage-related reset signal VRES_C and outputs it to system component 3 designed as processing unit 10 as soon a voltage level of third characteristic curve K3 shown in FIG. 2 falls below a predefined lower threshold value of a third tolerance band TS3, a voltage level of fourth characteristic curve K4 shown in FIG. 2 falls below a predefined lower threshold value of a fourth tolerance band TS4.

Of course, other assignments and combinations of internal system voltages V1, V2, V3, V4 with voltage-related reset signals VRES_A, VRES_B, VRES_C, VRES_D may be predefined via other configurations of evaluation and control unit 5.

As is furthermore shown in FIG. 1, control device 1 includes separate lines, which transfer voltage-related reset signals VRES_A, VRES_B, VRES_C selectively to individual system components 3. In this case, a first line transfers first voltage-related reset signal VRES_A to system component 3 designed as sensor 7. A second line transfers second voltage-related reset signal VRES_B to system component 3 designed as communication interface 9, and a third line transfers third voltage-related reset signal VRES_C to system component 3 designed as processing unit 10. Moreover, in the illustrated exemplary embodiment of control device 1, separate lines are also provided for the selective transmission of controller reset signals RES_A, RES_B, RES_C from system component 3 designed as processing unit 10 to other system components 3. A first line thus transfers a first controller reset signal RES_A selectively to system component 3 designed as communication interface 9. A second line transfers a second controller reset signal RES_B selectively to system component 3 designed as sensor 7. A third line transfers a third controller reset signal RES_C selectively to system component 3 designed as evaluation and control unit 5.

In one exemplary embodiment (not shown) of control device 1, system components 3 are electrically connected to one another via a bus. In this exemplary embodiment, processing unit 10 transfers controller reset signals RES_A, RES_B, RES_C as a digital message via the bus to other system components 3.

Individual system components 3 may be switched off or reset depending on their system function by described selective voltage-related reset signals VRES_A, VRES_B, VRES_C and controller reset signals RES_A, RES_B, RES_C. In case of emergency, more energy is thus available for critical functions of processing unit 10, for example, storing crash data, or triggering squibs. The system components which may be selectively switched off may be other system components 3, or also internal function blocks of processing unit 10.

Figure 3:
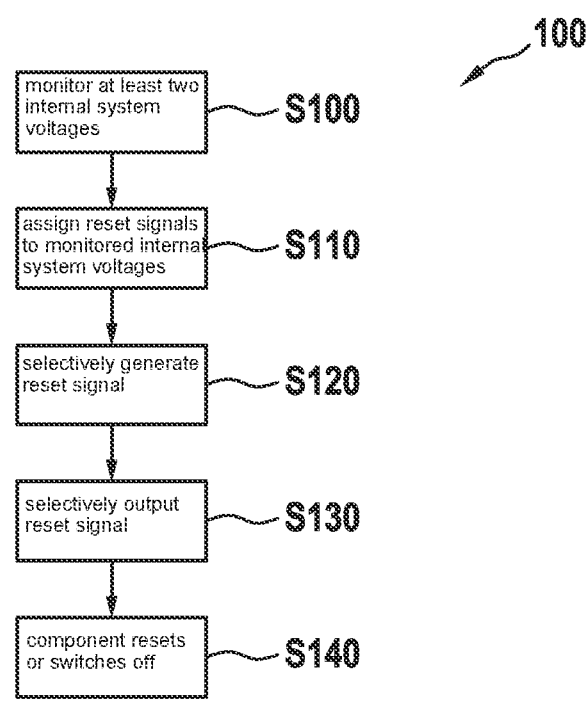
FIG. 3 shows a flowchart of an exemplary embodiment of a reset method according to the present invention for the control device according to the present invention from FIG. 1.

As is shown in FIG. 3, the illustrated exemplary embodiment of a reset method 100 according to the present invention for above-described control device 1, which includes multiple system components 3, of which one system component 3 is designed as processing unit 10, includes a step S100, in which at least two internal system voltages V1, V2, V3, V4 are monitored. In a step S110, various voltage-related reset signals VRES_A, VRES_B, VRES_C are each assigned to at least one of monitored internal system voltages V1, V2, V3, V4. In a step S120, as soon as the at least one assigned monitored internal system voltage V1, V2, V3, V4 is recognized to be erroneous, corresponding voltage-related reset signal VRES_A, VRES_B, VRES_C is selectively generated and, in a step S130, selectively output to at least one system component 3 which is supplied with internal system voltage V1, V2, V3, V4 recognized as erroneous. In a step S140, the at least one voltage-related reset signal VRES_A, VRES_B, VRES_C resets the corresponding at least one system component 3 or switches it off.

Optionally, depending on the function and/or the state, at least one controller reset signal RES_A, RES_B, RES_C may be generated by processing unit 10 and output to at least one assigned system component 3. In this case, the at least one controller reset signal RES_A, RES_B, RES_C selectively switches off the at least one assigned system component 3 or resets it.

Specific embodiments of the present invention generate multiple voltage-related reset signals which incrementally shut down the system, instead of having only one voltage-related reset signal as in conventional control devices, which is generated and output when the internal system voltage having the highest voltage level sinks below a predefined threshold value.

What is claimed is:

1. A control device for a vehicle, comprising:
a voltage supply; and
multiple system components, one of the system components a processing unit which, in combination with the other system components, carries out at least one device function and selectively switches off or resets assigned individual system components depending on a function and/or depending on a state via at least one selectively generated controller reset signal, the system components being supplied by at least two different internal system voltages, at least one monitoring function monitoring the at least two internal system voltages, different corresponding voltage-related reset signals each being assigned to at least one of the monitored internal system voltages, the at least one monitoring function being configured to, as soon as the at least one assigned monitored internal system voltage is recognized to be erroneous, selectively generate the corresponding voltage-related reset signal of the at least one assigned monitored internal system voltage recognized as erroneous and selectively outputting the corresponding voltage-related reset signal to at least one system component which is supplied with the internal system voltage recognized as erroneous, the at least one voltage-related reset signal configured to incrementally switch off or reset the at least one system component supplied with the internal system voltage recognized as erroneous,
wherein the at least one voltage-related reset signal is selected from a plurality of different voltage-related reset signals assigned to different internal system voltages and is selectively output to only the at least one system component supplied with the internal system voltage recognized as erroneous, thereby incrementally switching off or resetting only the at least one system component supplied with the erroneous voltage without resetting other system components.

2. The control device as recited in claim 1, wherein at least one of the system components is an evaluation and control unit, which is configured to carry out the at least one monitoring function and to monitor the at least two different internal system voltages and to generate and output the different voltage-related reset signals.

3. The control device as recited in claim 2, wherein the evaluation and control unit is configured to generate and output at least one of the different internal system voltages from a supply voltage provided by the voltage supply.

4. The control unit as recited in claim 1, wherein at least one of the system components is a voltage regulator and/or voltage converter, which generates and outputs at least one of the different internal system voltages from a supply voltage provided by the voltage supply.

5. The control unit as recited in claim 2, wherein the evaluation and control unit is a configurable ASIC module.

6. The control device as recited in claim 5, wherein a present configuration of the evaluation and control unit establishes which of the at least two internal system voltages are monitored, and which of the monitored internal system voltages is assigned to which of the voltage-related reset signals.

7. The control device as recited in claim 1, wherein at least one of the system components is a central sensor or a communication interface.

8. The control device as recited in claim 1, wherein the voltage supply includes an external voltage supply and an internal energy reserve.

9. The control unit as recited in claim 1, wherein separate lines selectively transmit the voltage-related reset signals or the controller reset signals directly to the individual system components.

10. The control unit as recited in claim 1, wherein the processing unit transmits the controller reset signals as a digital message via a bus to the other system components.

11. A reset method for a control unit including multiple system components, of which one of the system components is a processing unit, the method comprising:
monitoring at least two internal system voltages being monitored, different corresponding voltage-related reset signals each being assigned to at least one of the monitored internal system voltages; and
selectively generating, as soon as the at least one assigned monitored internal system voltage is recognized as erroneous, the corresponding voltage-related reset signal of the assigned monitored internal system voltage recognized as erroneous, and selectively outputting the corresponding voltage-related reset signal to at least one system component, which is supplied with the internal system voltage recognized as erroneous, the at least one voltage-related reset signal configured to incrementally reset or switch off the at least one component which is supplied with the internal system voltage recognized as erroneous,
wherein the at least one voltage-related reset signal is selected from a plurality of different voltage-related reset signals assigned to different internal system voltages and is selectively output to only the at least one system component supplied with the internal system voltage recognized as erroneous, thereby incrementally switching off or resetting only the at least one system component supplied with the erroneous voltage without resetting other system components.

12. The reset method as recited in claim 11, wherein, depending on a function and/or depending on a state, at least one controller reset signal is generated by the processing unit and output to at least one assigned system component, the at least one controller reset signal selectively switching off or resetting the at least one assigned system component.

13. The reset method as recited in claim 11, wherein a first voltage-related reset signal is generated and output to at least one of the system components as soon as a voltage level of a first internal system voltage is below a predefined first threshold value or above a predefined second threshold value or outside a first tolerance band, which is defined by the first threshold value and the second threshold value.

14. The reset method as recited in claim 13, wherein a second voltage-related reset signal is generated and output to at least one of the system components as soon as a voltage level of a second internal system voltage, which is lower than the voltage level of the first internal system voltage, is below a predefined third threshold value or above a predefined fourth threshold value or outside a second tolerance band, which is defined by the third threshold value and the fourth threshold value.

15. The reset method as recited in claim 14, wherein a third voltage-related reset signal is generated and output to the processing unit as soon as a voltage level of a third internal system voltage, which is lower than the voltage level of the second internal system voltage, is below a predefined fifth threshold value or above a predefined sixth threshold value or outside a third tolerance band, which is defined by the fifth threshold value and the sixth threshold value, or a voltage level of a fourth system voltage, which is lower than the voltage level of the third internal system voltage, is below a predefined seventh threshold value or above a predefined eighth threshold value or outside a fourth tolerance band, which is defined by the seventh threshold value and the eighth threshold value.

16. The control device as recited in claim 1, wherein the individual system components are selectively deactivated via the various controller reset signals, while other system components remain available.

\* \* \* \* \*